United States Patent [19]

Aoyagi et al.

[11] 4,444,716
[45] Apr. 24, 1984

[54] METHOD FOR MANUFACTURE OF HOLLOW FIBER

[75] Inventors: Juuro Aoyagi; Kazuaki Takahara, both of Tokyo; Yukio Seita, Fujinomiya, all of Japan

[73] Assignee: Terumo Kabushiki Kaisha Trading as Terumo Corporation, Tokyo, Japan

[21] Appl. No.: 381,857

[22] Filed: May 25, 1982

[30] Foreign Application Priority Data

Jun. 1, 1981 [JP] Japan .............................. 56-82555

[51] Int. Cl.³ .............................................. B29D 27/00
[52] U.S. Cl. .................................... 264/561; 264/199; 264/209.1
[58] Field of Search ............ 264/561, 184, 558, 178 F, 264/209.1, 184, 199

[56] References Cited

U.S. PATENT DOCUMENTS

| | | | |
|---|---|---|---|
| 1,119,155 | 12/1914 | Hartoss | 264/184 |
| 3,448,185 | 6/1969 | Sims | 264/178 Z |
| 3,822,333 | 7/1974 | Harata et al. | 264/178 R |
| 4,086,418 | 4/1978 | Turbak et al. | 264/187 |
| 4,141,942 | 2/1979 | Maehara | 264/187 |
| 4,289,723 | 9/1981 | Leoni et al. | 264/187 |
| 4,342,711 | 8/1982 | Loh et al. | 264/561 |

FOREIGN PATENT DOCUMENTS

| | | | |
|---|---|---|---|
| 50-132218 | 10/1975 | Japan | 264/561 |
| 53-70128 | 6/1978 | Japan | 264/561 |
| 54-131029 | 10/1979 | Japan | 264/177 F |

*Primary Examiner*—Jay H. Woo
*Attorney, Agent, or Firm*—Frishauf, Holtz, Goodman & Woodward

[57] ABSTRACT

A method for the manufacture of a hollow fiber which comprises extruding a cellulosic spinning dope through an annular spinning nozzle directly into a non-coagulative liquid layer in a bath filled in the upper layer with a coagulative liquid relative to said spinning dope and in the lower layer with a non-coagulative liquid of a halogenated hydrocarbon and, at the same time, introducing a non-coagulative liquid relative to said spinning dope into the inner center of the tubularly extruded thread of spinning dope, and subsequently passing the resultant tubular fiber of spinning dope through said coagulative liquid thereby coagulating and regenerating the fiber.

20 Claims, 3 Drawing Figures

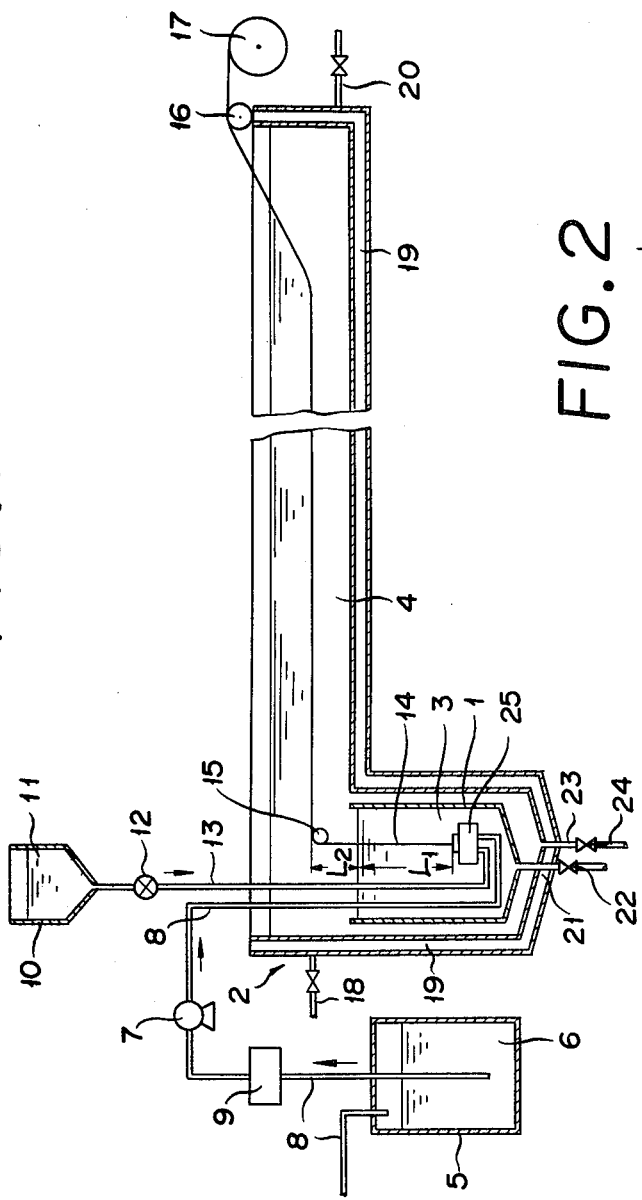
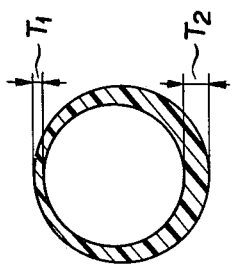

METHOD FOR MANUFACTURE OF HOLLOW FIBER

BACKGROUND OF THE INVENTION

1. Field of the Invention

This invention relates to a method for the manufacture of a hollow fiber. More particularly, this invention relates to a novel method for the manufacture of a hollow fiber for dialysis which is used as in the artificial kidney and the like.

2. Description of Prior Arts

Recently, artificial kidneys utilizing the action of osmosis and that of ultrafiltration have been making remarkable progress and are widely utilized in the field of medical treatments. In such artificial kidneys, very fine hollow fibers for dialysis constitute the most important component member.

The hollow fibers for dialysis are represented by (1) a hollow fiber having a uniform wall thickness of several $\mu m$, to 60 $\mu m$ and a uniform truly circular cross section of 10 $\mu m$ to some hundred $\mu m$ of outside diameter throughout the entire fiber length and the entire circumference, having an oriented texture, and continuously pierced throughout the entire extent of the fiber (Japanese Patent Publication No. 40168/1975), (2) a man-made hollow fiber formed of cuprammonium regenerated cellulose in a cross-sectional construction such that the portion of cellulose close to the outer surface has a denser porous structure than the portion of cellulose close to the inner surface and the intermediate portion of cellulose (Japanese Patent Publication No. 1363/1980), and (3) a hollow fiber for dialysis made of cuprammonium regenerated cellulose in the shape of a tube containing a hollow core such that, in observation under an electron microscope, the entire lateral and longitudinal cross sections show a substantially homogeneous, fine porous structure containing minute pores of at most 200 Å and skinless, smooth surfaces on both inner and outer boundaries (Japanese Patent Publication No. 134920/1974). All of these hollow fibers are produced invariably by extruding a spinning dope of cuprammonium cellulose through an annular spinning nozzle into the ambient air and allowing the extruded tubular fiber of spinning dope to fall downwardly by its own weight and, at this point, introducing a non-coagulant liquid relative to the spinning dope to fill the inner core of the tubularly extruded fiber of spinning dope thereby allowing the tubular fiber to be thoroughly drawn out by the fall due to the gravitational attraction, and thereafter immersing the tubular fiber into a bath of dilute sulfuric acid thereby coagulating and regenerating the cuprammonium cellulose in the tubular fiber.

To make a device for dialysis such as an artificial kidney from such a hollow fiber there is adopted a procedure which involves inserting a bundle of hollow fibers in a tubular body provided with an inlet tube and an outlet tube near the opposite extremities thereof and sealing the opposite extremities of the bundle together with the opposite extremities of the tubular body with a resin such as of polyurethane. The device thus produced has a construction resembling a shell and tube type device such as is used in a heat exchanger.

As described above, the conventional hollow fibers are produced by the steps of extruding a spinning dope of cuprammonium cellulose into a gaseous atmosphere such as of air, allowing the extruded tubular fiber to fall by its own weight, and thereafter immersing the tubular fiber in a coagulant liquid thereby coagulating and regenerating the cellulose in the fiber. While the tubular fiber of spinning dope is falling through the gaseous atmosphere, therefore, ammonia separates to some extent from the fiber and begins to coagulate in the surface region of the fiber. Consequently, the produced hollow fibers invariably form a skin on the outer surface, though to varying degrees depending on the particular method of manufacture. Thus, the produced fibers do not acquire a uniform texture throughout the inner and outer surface regions and the intermediate region. When such hollow fibers are used in a device for dialysis, since the fine pores formed in the inner surface region, the intermediate region, and the outer surface region have different diameters, the fiber properties are not fixed in the direction of the wall thickness of the individual hollow fibers. The device, therefore, has a disadvantage that it fails to provide required dialysis with satisfactory results. Further in the conventional method described above, since the spinning nozzle is inevitably exposed to the gaseous atmosphere, the temperature of the spinning dope just discharged from the spinning nozzle and that of the non-coagulant liquid introduced in the inner core of the extruded fiber of spinning dope are difficult to control.

Further in the conventional method, if the non-coagulant liquid placed inside the fiber of spinning dope tubularly extruded through the spinning nozzle leaks, the leaking liquid floats on the upper layer of the coagulant liquid. When the tubular fiber of spinning dope is immersed into the coagulant liquid, therefore, it inevitably passes through the non-coagulant liquid layer. This contact with the non-coagulant liquid forms a possible cause for breakage of the hollow fiber.

Accordingly, an object of the present invention is to provide a novel method for manufacture of a hollow fiber.

Another object of the present invention is to provide a method for the manufacture of a hollow fiber having a perfectly homogeneous texture throughout the inner and outer surface regions as well as in the intermediate region.

Still another object of the present invention is to provide a method for the manufacture of a hollow fiber having good production environment, high safety to fire and proving inexpensive.

SUMMARY OF THE INVENTION

These objects can be accomplished by a method for the manufacture of a hollow fiber which comprises extruding a cellulosic spinning dope through an annular spinning nozzle directly into a non-coagulative liquid layer in a bath filled in the upper layer with a coagulative liquid relative to said spinning dope and in the lower layer with a non-coagulative liquid of a halogenated hydrocarbon and, at the same time, introducing a non-coagulative liquid relative to said spinning dope into the inner center of the tubularly extruded fiber of spinning dope, and subsequently passing the resultant tubular thread of spinning dope through said coagulative liquid thereby coagulating and regenerating the fiber.

BRIEF DESCRIPTION OF THE DRAWINGS

FIG. 1 is a schematic sectioned diagram showing one embodiment of the device for working the method of this invention for the manufacture of a hollow fiber, FIG. 2 is a model diagram of the cross section of a hollow fiber to be obtained by the method of this invention.

PREFERRED EMBODIMENT OF THE INVENTION

Figure 3:
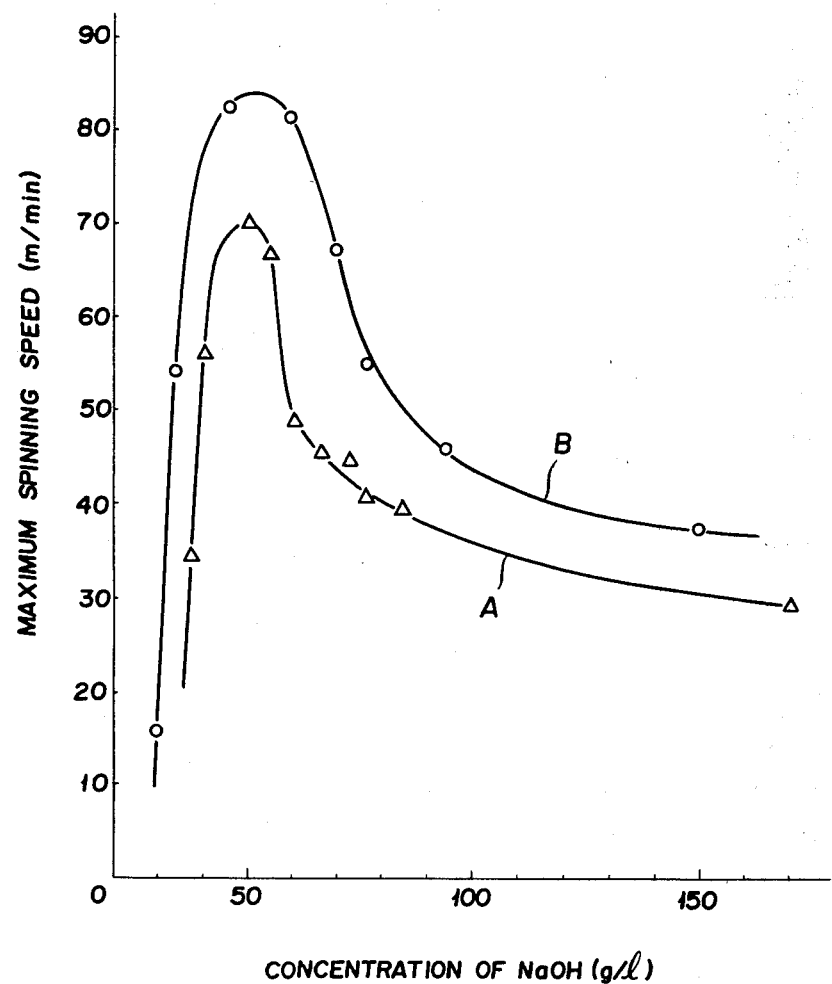
FIG. 3 is a graph showing the relation between the concentration of the coagulant liquid and the maximum spinning speed obtained of the operation of the method of the present invention.

Now, the method of this invention will be described in detail below with reference to the accompanying drawing. In a bath 2 which is provided in the bottom thereof with a non-coagulant bath 1 as shown in FIG. 1, a two-layer bath is formed in the non-coagulant liquid bath 1 by supplying as a lower-layer bath a liquid 3 formed of a halogenated hydrocarbon and incapable of coagulating the aforementioned spinning dope of cellulose and as an upper-layer bath a liquid 4 having a lower specific gravity than the non-coagulant liquid 3 and capable of coagulating the aforementioned spinning dope of cellulose.

A spinning dope of cellulose 6 in a dope reservoir 5 is forwarded under pressure by means of a pump (such as, for example, a gear pump) 7 through a duct 8 to a filter 9 and passed therethrough. Then the spinning dope is directly extruded through an annular spinning nozzle (not shown) disposed upwardly in a spinneret 25 into the aforementioned non-coagulant liquid 3 forming the lower layer of the bath. At this point, a liquid 11 incapable of coagulating the spinning dope and stored in an inner liquid reservoir 10 is supplied as an inner liquid by virtue of natural head to a flowmeter 12, then forwarded via a conduit 13 to the aforementioned spinneret 25, and lead and discharged into the inner center of the tubularly extruded fiber of spinning dope 14. The tubular fiber of spinning dope 14 which has been extruded through the annular spinning nozzle advances upwardly in its uncoagulated state through the non-coagulant liquid 3 of the lower layer while still containing therein the non-coagulant liquid 11. In this case, the tubular fiber of spinning dope 14 is allowed to ascend by the buoyancy generated because of the difference of specific gravity between the spinning dope and the non-coagulant liquid. Then, the tubular fiber of spinning dope 14 rises into the coagulant liquid 4 of the upper layer. In this upper layer, the tubular fiber is bent sidewise by means of a direction changing rod 15 disposed within the coagulant liquid 4, passed amply through the aforementioned coagulant liquid 4, pulled up from the liquid by means of a roll 16, taken up on a winding device 17 and then forwarded to the subsequent step.

In this case, the coagulant liquid 4 in the bath 2 can be kept at a prescribed temperature such as, for example, 20±2° C., by feeding a constant temperature circulation liquid 19 though an inlet 18 of a cooling jacket and discharging this liquid via an outlet 20 of the jacket. After the use of the bath or during the change of liquid, the non-coagulant liquid 3 is discharged via an outlet 21 and a valve 22. Similarly after the use of the bath or during the change of liquid, the coagulant liquid 4 is discharged through an outlet 23 and a valve 24.

The spinning dope of cellulose to be used in the method of this invention is a metal ammonia cellulose such as cuprammonium cellulose. The cellulose may be used in any of various forms. For example, a cellulose having an average polymerization degree of 500 to 2500 is advantageously used. The cuprammonium cellulose solution is prepared by the ordinary method known to the art. For example, the cuprammonium cellulose solution is obtained by first mixing ammonia water, an aqueous basic copper sulfate solution, and water to prepare an aqueous copper ammonium solution, adding an antioxidant (such as sodium sulfite) thereto, placing the cellulose in the solution and dissolving it therein by agitation, and further adding an aqueous sodium hydroxide solution thereto to effect thorough dissolution of the undissolved cellulose. The cuprammonium cellulose solution thus obtained may further incorporate therein a permeability regulating agent to effect formation of coordinate bonds.

As the permeability regulating agent, an ammonium salt or alkali metal salt of a polymer or copolymer having a number-average molecular weight of 500 to 200,000, preferably 1,000 to 100,000, and containing in the unit monomer thereof 10 to 70 equivalent percent, preferably 15 to 50 equivalent percent, of a carboxyl group is available. Various polymers meet the description given above. Examples of such polymers are copolymers between such carboxyl group-containing unsaturated monomers as acrylic acid and methacrylic acid and other copolymerizable monomers and partial hydrolyzates of polyacrylonitrile. Examples of copolymerizable monomers are alkyl acrylates such as methyl acrylate, ethyl acrylate, isopropyl acrylate, butyl acrylate, hexyl acrylate, and lauryl acrylate; alkyl methacrylates such as methyl methacrylate, ethyl methacrylate, and butyl methacrylate; acrylamide, methacrylamide, acrylonitrile, methacrylonitrile, hydroxyalkyl acrylates (or methacrylates), dialkylamino acrylates (or methacrylates), vinyl acetate, styrene, and vinyl chloride. Among other monomers enumerated above, alkyl acrylates and alkyl methacrylates are particularly desirable. The most desirable copolymers, therefore, are acrylic acid-alkyl acrylate (or methacrylate) copolymers, methacrylic acid-alkyl acrylate (or methacrylate) copolymers, and partial hydrolyzates of polyalkyl acrylates (or methacrylates). Such a permeability regulating agent is used generally in an amount of 1 to 40 weight parts, more desirably 2 to 30 weight parts, and most desirably 3 to 15 weight parts, based on 100 weight parts of the cellulose. The spinning dope is obtained, for example, by dissolving this permeability regulatng agent in the cuprammonium cellulose solution and stirring the resultant solution at a temperature in the range of 8° to 30° C., preferably 14° to 25° C. for a period of 20 to 120 minutes, preferably 60 to 100 minutes thereby causing the agent to form a coordinate bond with the cuprammonium cellulose.

The spinning dope thus obtained generally has a specific gravity in the range of 1.05 to 1.15, preferably 1.06 to 1.10. Since the tubular fiber of spinning dope extruded through the spinning nozzle is filled in the inner core thereof with the non-coagulant liquid as described more fully afterward, the tubular fiber generally has a smaller specific gravity than the spinning dope in the reservoir. Specifically, this specific gravity is 1.00 to 1.08, preferably 1.01 to 1.04.

The non-coagulant liquid relative to the spinning dope of cellulose to be used as the lower layer of the bath is a halogenated hydrocarbon which has a specific gravity greater than the bulk specific gravity of the tubular thread of spinning dope (containing the non-coagulant liquid as the inner liquid) and the specific gravity of the coagulant liquid and shows a low solubility in water and a small surface tension. The specific gravity of the non-coagulant liquid geenrally exceeds 1.3 and preferably falls in the range of 1.4 to 1.7. Examples of halogenated hydrocarbons usable as the non-coagulant liquid include carbon tetrachloride ($d_4^{20}$=1.632, solubility in water 0.08 g/100 ml at 20° C., surface tension 26.8 dynes/cm at 25° C.), 1,1,1-trichloro-1,1,2-trichloroethane ($d_4^{20}$=1.442), trichloroethylene ($d^{15}$=1,440, solubility in water 0.11 g/100 ml at 25° C., surface tension 31.6 dynes/cm at 25° C.), tetrachloroethane ($d_0^{25}$=1.542), tetrachloroethylene ($d^0$=1.656, no solubility in water), and trichlorotrifluoroethane ($d^{25}$=1.565, solubility in water 0.009 g/100 ml at 21° C., surface tension 19.0 dynes/cm at 25° C.). Among the halogenated hydrocarbons enumerated above, particularly those which show solubility in water below 0.05 g/100 ml at 21°°C. and surface tension below 20 dynes/cm at 25° C. are desirable because their use results in notable improvement of the spinnability of the dope. Examples of the non-coagulant liquid which answers this description are tetrachloroethylene and trichlorotrifluoroethane. The height of the non-coagulant liquid layer (the distance $L_1$ indicated in FIG. 1), though variable to some extent with the spinning rate, generally falls in the range of 50 to 250 mm, preferably 100 to 200 mm.

The choice of the non-coagulant liquid (inner liquid) to be used for filling the inner core of the tubular fiber of spinning dope has a notable effect on the maintenance of the inner core of the hollow fiber and on the presence or absence of rises and falls of the wall surface of the hollow fiber. For example, when the non-coagulant liquid filling the inner core of the hollow fiber penetrates through the wall and suddenly bursts out of the fiber, the hollow fiber assumes a vacuumized interior and cave in under the external pressure or produces rises and falls on the inner wall surface. The non-coagulant liquid is selected from among those liquids which show low permeability and small specific gravity when dry. The specific gravity of the spinning dope of cellulose is generally 1.05 to 1.15 and that of the spinning dope of cuprammonium cellulose is about 1.08. Thus, the non-coagulant liquid should be selected so that the specific gravity thereof would give the tubular fiber of spinning dope containing the non-coagulant liquid a bulk specific gravity of 1.00 to 1.08, more desirably 1.01 to 1.04, about 1.02 to be specific. Thus, the specific gravity of the non-coagulant liquid generally falls in the range of 0.65 to 1.00, more desirably 0.70 to 0.90, about 0.85 to be specific. Examples of the non-coagulant liquid advantageously used herein include n-hexane, n-heptane, n-octane, n-decane, n-dodecane, liquid paraffin, isopropyl myristate, light oil, keorsene, benzene, toluene, xylene, styrene, and ethylbenzene.

The coagulant liquid for the spinning dope of cellulose has a specific gravity smaller than the non-coagulant liquid forming the lower layer of the bath. Generally, it is an aqueous alkali solution having a specific gravity in the range of 1.03 to 1.10. Examples of the alkali usable in this aqueous solution are sodium hydroxide, potassium hydroxide, lithium hydroxide, and ammonium hydroxide. Among other alkalis enumerated above, sodium hydroxide proves particularly desirable. The concentration of the alkali calculated as sodium hydroxide is 30 to 150 g-NaOH/liter, desirably 35 to 80 g-NaOH/liter, and most desirably 40 to 60 g-NaOH/liter, especially about 50 g-NaOH/liter (about 4.8 weight percent, d=1.055). The distance from the interface between the non-coagulant liquid and the coagulant-liquid to the direction-changing rod (the distance $L_2$ indicated in FIG. 1) is generally 5 to 30 mm, preferably 10 to 20 mm.

By the method of this invention described above, the hollow fiber is obtained at a spinning speed of more than about 30 m/min. Particularly when the non-coagulant liquid to be used in the bath has solubility in water below 0.05 g/100 liters at 21° C. and surface tension below 20 dynes/cm, the spinning speed can be increased above about 38 m/min., particularly about 55 m/min.

The hollow fiber which has been coagulated and regenerated by the treatment described above is washed with water to remove the coagulant liquid still adhering thereto, then optionally subjected to a treatment for the removal of copper or other similar metal still remaining in the hollow fiber, and again washed with water. The treatment for the removal of such remaining metal is carried out by immersing the hollow fiber in a dilute sulfuric acid or nitric acid solution having a concentration of 3 to 30 percent. Where the spinning dope contains the permeability regulating agent as described above, the hollow fiber is divested of the regulating agent while travelling in the aforementioned alkaline coagulant liquid. The departure of the regulating agent leaves fine pores corresponding to the molecular weight of the used polymer behind in the tubular wall of the hollow fiber.

The hollow fiber which has been washed with water or which has been divested of the permeability-regulating agent as described above is optionally treated with a hot water of 35° to 100° C., preferably 50° to 80° C. or plasticized with an aqueous glycerine solution having a concentration of 1 to 10 weight percent, preferably 2 to 5 weight percent, to ensure removal of still remaining extraneous substances such as copper, cupric sulfate, copper hydrogen sulfate, and medium- to low-molecular cellulose, then dried, and taken up to obtain the hollow fiber aimed at. The hollow fiber thus obtained has an inside diameter of 50 to 500 μm, preferably 150 to 300 μm, and a wall thickness of 5 to 60 μm, preferably 8 to 30 μm. As shown in FIG. 2, this hollow fiber has a cross section including a small wall thickness $T_1$ and a large wall thickness $T_2$ such that the ratio of the minimum wall thickness to the maximum wall thickness falls in the range of 0.2:1 to 0.8:1, preferably 0.5:1 to 0.7:1.

As described above, by the method of this invention, the manufacture of the hollow fiber is accomplished by directly extruding a cellulosic spinning dope through an annular spinning nozzle into a non-coagulative liquid layer in a bath filled in the upper layer with a coagulative liquid relative to said spinning dope and in the lower layer with a non-coagulative liquid of a halogenated hydrocarbon and, at the same time, introducing a non-coagulative liquid relative to said spinning dope into the inner center of the tubularly extruded fiber of spinning dope, and subsequently passing the resultant tubular fiber of spinning dope through said coagulative liquid thereby coagulating and regenerating the fiber. Since the spinning dope is directly extruded into the non-coagulant liquid unlike the conventional method which involves direct extrusion of the spinning dope into a gaseous atmosphere such as air, it has no possibility of entailing the dispersion of ammonia which would occur during the passage of the freshly extruded spinning dope through the gaseous atmosphere. Consequently, the produced hollow fiber has a perfectly homogeneous texture throughout the inner and outer surface regions as well as in the intermediate region. Since the spinneret is kept immersed in the liquid, the temperature of the extruded spinning dope (including the inner liquid) can be easily controlled.

Moreover, the non-coagulant liquid used in the bath is not flammable and, therefore, has no possibility of causing a fire. Since the coagulant liquid forms the upper layer of the bath, the non-coagulant liquid is retained in a tightly closed state and consequently is prevented from polluting the ambient air. The consumption of the non-coagulant liquid is so small that the work done by this liquid proves inexpensive. If the inner liquid happens to lead, it readily floats up and separates itself in the uppermost layer (on the coagulant liquid) of the bath, the hollow fiber does not suffer from the otherwise possible breakage due to leakage and the interface between the two liquids is kept clean at all times. There is a further advantage that the concentration of the coagulant liquid can be selected in a wide range.

Now, the present invention will be described more specifically with reference to working examples. Wherever percents are mentioned in the following examples, they shall mean percents by weight unless otherwise specified.

EXAMPLE 1

An aqueous cuprammonium solution was prepared by suspending 5148 g of an aqueous 28 percent ammonia solution and 864 g of basic copper sulfate in 1200 ml of water. To this solution was added 2725 ml of an aqueous 10 percent sodium sulfite solution. In the resultant solution, 1900 g of cotton linter pulp having a polymerization degree of about 1000 ($\pm$100) was placed and dissolved by stirring. By subsequent addition thereto of 1600 ml of an aqueous 10 percent sodium hydroxide solution, there was obtained an aqueous cuprammonium cellulose solution (specific gravity 1.08) to be used as a spinning dope.

Separately, in a device constructed as shown in FIG. 1, 1,1,1-trichloroethane was supplied as a non-coagulant liquid 3 to the non-coagulant liquid bath 1 of the bath 2 to form a lower layer and then an aqueous 50 g/liter sodium hydroxide solution was supplied as a coagulant liquid thereto to foam an upper layer. The aforementioned spinning dope 6 stored in the spinning dope reservoir 5 was led through the filter 9 to the spinneret 25 having the annular spinning nozzle upwardly mounted therein and directly extruded with 2.5 kg/cm$^2$ of nitrogen pressure through the spinning nozzle into the non-coagulant liquid 3 of the lower layer kept at a temperature of 20$\pm$2° C. The diameter of the spinning nozzle was 3.8 mm and the discharge rate of the spinning dope [cell 7.4 percent, 1.750 p (7.5° C.)] was fixed at 6.47 ml/min. At the same time, isopropyl myristate (specific gravity 0.854) was introduced through the conduit 13 for a non-coagulant liquid incorporated in the spinneret 25 and discharged into the inner center of the tubular fiber of spinning dope being extruded through the spinning nozzle. The diameter of the conduit was 1.2 mm and the discharge rate of isopropyl myristate was fixed at 2.60 ml/min. Then, the extruded tubular fiber of spinning dope (containing the non-coagulant liquid) 14 (specific gravity 1.026) was allowed to ascend through 1,1,1-trichloroethane and further through the aqueous sodium hydroxide solution (20$\pm$2° C.) of the upper layer. Thereafter, the path of the tubular fiber was changed toward a horizontal direction by means of the direction changing rod 15. In the bath, the height L$_1$ of the layer of the non-coagulant liquid was 150 mm, the distance L$_2$ from the interface of the two liquids to the upper end of the direction-changing rod 15 was 15 mm, the spinning rate was fixed at 60 m/min., the traverse wind at 80, and the distance of travel at 4.4 m. The tubular fiber was raised from the bath and washed with water of a bath length of about 10 m and taken up on a winding reel. The fiber wound on the reel was placed in a tank, showered with hot water, and washed at 30° C. for ten hours. The fiber was dried by being passed at a speed of 10 m/min. through a tunnel type drier oven (5 m in length) kept at 120° C.$\pm$10° C. Consequently, there was obtained a hollow fiber.

The hollow fiber thus obtained measured 180 $\mu$m in minimum inside diameter, 220 $\mu$m in maximum inside diameter, 200 $\mu$m in average inside diameter, 17 $\mu$m in minimum wall thickness, 27 $\mu$m in maximum wall thickness, and 21 $\mu$m in average wall thickness, and had a homogeneous, skinless texture through the inner and outer surface regions and in the intermediate region. It showed good spinnability, with the elongation at 30$\pm$10 percent and the draft ratio at 73.

The hollow fibers (wall surface 0.88 m$^2$) obtained as described above were subjected to a Dialysance test using reference substances of known molecular weights [urea (BUN) of a molecular weight of 60, phosphoric acid ion of a molecular weight of 95, creatinine of a molecular weight of 113, and vitamin B$_{12}$ of a molecular weight of 1355]. The results were as shown in Table 1.

The procedure described above was repeated by using the aqueous sodium hydroxide solution of a varying concentration as the coagulant liquid, with the maximum spinning rate measure in each test run. Consequently, the curve A of FIG. 3 was obtained.

EXAMPLE 2

The procedure of Example 1 was followed, except that trichlorotrifluoroethane was used as the non-coagulant liquid 3, an aqueous 46 g/liter sodium hydroxide solution was used as the coagulant liquid, the spinning dope [cell 8.7 percent, 2.670 p. (20° C.)] was extruded at a rate of 6.47 ml/min., and isopropyl myristate (specific gravity 0.854) was discharged at a rate of 2.64 ml/min. into the inner center of the tubular fiber of spinning dope. Consequently, a hollow fiber was obtained at a spinning rate of 83 m/min.

The hollow fiber thus obtained measured 150 $\mu$m in minimum inside diameter, 170 $\mu$m in maximum inside diameter, 160 $\mu$m in average inside diameter, 12 $\mu$m in minimum wall thickness, 22 $\mu$m in maximum wall thickness, and 16 $\mu$m in average wall thickness and had a homogeneous, skinless texture throughout the inner and outer surface regions and in the intermediate region. The spinnability was good, with the elongation at 30$\pm$10 percent and the draft ratio at 101. When the hollow fibers obtained as described above were subjected to the same Dialysance test as in Example 1, the results were as shown in Table 1.

The procedure described above was repeated by using the same aqueous sodium hydroxide solution of a varying concentration, with the maximum spinning rate measured in each test run. Consequently, the curve B of FIG. 3 was obtained.

Control

The same spinning dope as used in Example 1 was led to the spinneret provided with an annular spinning nozzle and extruded through the spinning nozzle under 6 kg/cm² of nitrogen pressure. The diameter of the spinning nozzle was 3.8 mm and the discharge rate of the spinning dope was fixed at 15.5 ml/min. Separately, isopropyl myristate was introduced through the conduit for the non-coagulant liquid incorporated in the spinneret and discharged into the inner center of the tubular fiber of spinning dope. The diameter of the conduit was 1.2 mm and the discharge rate of isopropyl myristate was fixed at 5.0 ml/min. The extruded thread of spinning dope was allowed to fall freely to 200 mm in the ambient air and then introduced at a bath length of 12 m immediately into a combination coagulation and regeneration bath kept at a temperature of about 20° C. and filled with an aqueous 20 percent sulfuric acid solution. At this point, the spinning rate of 100 m/min. Then, it was led into a water bath at a temperature of about 20° C. and washed with water at a bath length of about 4 m, and then taken up on a winging reel. The thread thus wound on the reel was passed at a bath length of 12 m through a copper-removing bath filled with an aqueous 5 percent sulfuric acid solution, then passed at a bath length of 8 m through an alkali bath filled with 4 percent sodium hydroxide for the removal of the copolymer salt, washed with water, and taken up. At this time, the treating rate of 8 m/min. The rhread wound on the reel was placed in a tank, showered with hot water, stirred in the hot water at 70° C. under 260 mmHg for one hour, and removed from the water. By repeating this treatment three times, the low-molecular compound was removed from the thread. The thread thus subjected to the hot-water treatment was dried by being passed at a speed of 4.8 m/min. through a tunnel type drier oven (3.45 m in length) kept at 120° C.±10° C. Consequently, there was obtained a hollow fiber.

The hollow fibers obtained as described above were subjected to the same Dialysance test as in Example 1. The results were as shown in Table 1.

TABLE 1

| Sample | D pressure difference (mm Hg) In | Out | B pressure difference (mm Hg) In | Out | BUN | Film property (ml/min) Phosphoric acid ion | Creatinine | $VB_{12}$ | UFR (ml/mm Hg · hr) |
|---|---|---|---|---|---|---|---|---|---|
| Example 1 | 28 | 20 (8) | 26 | 22 (4) | 167 | 116 | 140 | 40.4 | 4.1 |
| Example 2 | 50 | 40 (10) | 50 | 40 (10) | 171 | 120 | 141 | 42.0 | 4.4 |
| Control (inner diameter 254 μm; wall thickness 14 μm) | 50 | 40 (10) | 50 | 40 (10) | 122 | 80 | 100 | 13.0 | 1.4 |

What is claimed is:

1. A method of producing a hollow fiber having a substantially circular cross-section, said method comprising:
   (a) extruding a metal ammonia cellulose containing spinning dope through an annular spinning nozzle directly into a lower layer of a two-layer bath, said lower layer containing a first non-coagulating liquid selected from the group consisting of halogenated hydrocarbons and said bath further comprising an upper layer containing a coagulating liquid to thereby form a tubular extruded thread, wherein the height of the first non-coagulating liquid of the lower layer measured from the annular spinning nozzle to the interface of the first non-coagulating liquid and the upper layer is between 50 and 250 mm, and simultaneously introducing into the tubular hollow of said tubular extruded thread a second non-coagulating liquid; and
   (b) passing said tubular extruded thread containing said second non-coagulating liquid upwardly into and through said upper layer containing said coagulating liquid to thereby form said hollow fiber.

2. The method of claim 1, wherein said metal ammonia cellulose is cuprammonium cellulose.

3. The method of claim 1, wherein the spinning dope further comprises a permeability regulating agent selected from ammonium and alkali metal salts of a polymer or copolymer having a number average molecular weight of between 500 and 200,000, said polymer or copolymer containing 10 to 70 equivalent percent of a carboxyl group.

4. The method of claim 1, wherein the specific gravity of the tubular extruded thread containing said second non-coagulating liquid is less than said first non-coagulating liquid.

5. The method of claim 4, wherein the specific gravity of said first non-coagulating liquid is at least 1.3.

6. The method of claim 4, wherein the specific gravity of said tubular extruded thread containing said second non-coagulating agent is between 1.05 and 1.15.

7. The method of claim 5, wherein the specific gravity of the first non-coagulating liquid is between 1.4 and 1.7.

8. The method of claim 5, wherein the first non-coagulating liquid is selected from those having a solubility in water of up to 0.05 g/100 ml at 21° C.

9. The method of claim 1, wherein said first non-coagulating liquid is selected from tetrachloroethylene and trichlorotrifluoroethane.

10. The method of claim 4, wherein the specific gravity of said second non-coagulating liquid is between 0.65 and 1.00.

11. The method of claim 4, wherein said second non-coagulating liquid is selected from the group consisting of n-hexane, n-heptane, n-octane, n-decane, n-dodecane, liquid paraffin, isopropyl myristate, light oil, kerosene, benzene, toluene, xylene, styrene, and ethylbenzene.

12. The method of claim 1, wherein the coagulating liquid is an aqueous alkali solution.

13. The method of claim 12, wherein the aqueous alkali solution is a sodium hydroxide solution having a concentration of 30 to 150 g/liter.

14. The method of claim 13, wherein the concentration of the sodium hydroxide solution is 35 to 80 g/liter.

15. The method of claim 1, wherein the fiber hollow has a diameter of between 50 and 500 μm and the thickness of the wall is between 5 and 60 μm.

16. The method of claim 15, wherein the ratio of the minimum thickness of the wall and the maximum thickness of the wall is in the range of 0.2:1 to 0.8:1.

17. The method of claim 1, wherein the rate of extrusion of the dope through the annular spinning nozzle is at least 30 m/min.

18. The method of claim 17, wherein the rate of extrusion of the dope through the annular spinning nozzle is at least 38 m/min.

19. A method of producing a hollow fiber having a substantially circular cross-section having a diameter of between 50 and 500 μm, said method comprising:
   (a) extruding a metal ammonia cellulose containing spinning dope through an annular spinning nozzle directly into a lower layer of a two-layer bath, said lower layer containing a first non-coagulating liquid having a specific gravity of at least 1.3 and selected from the group consisting of halogenated hydrocarbons, and said bath further comprising an upper layer containing a sodium hydroxide solution having a concentration of between 30 and 150 g/liter, wherein the height of the first non-coagulating liquid of the lower layer measured from the annular spinning nozzle to the interface of the non-coagulating liquid and the upper layer is between 50 and 250 mm, and simultaneously introducing into the tubular hollow of said tubular extruded thread a second non-coagulating liquid having a specific gravity of between 0.65 and 1.0; and
   (b) passing said tubular extruded thread containing said second non-coagulating liquid upwardly into and through said upper layer containing said sodium hydroxide solution to thereby form said hollow fiber.

20. The method of claim 19, wherein said metal ammonia cellulose is cuprammonium cellulose.

* * * * *